United States Patent [19]

Prussin

[11] 4,053,647

[45] Oct. 11, 1977

[54] PET FOOD PRODUCT AND PROCESS OF PRODUCING SUCH

[76] Inventor: Samuel Prussin, General Delivery, Carmel, Calif. 93921

[21] Appl. No.: 640,163

[22] Filed: Dec. 12, 1975
[51] Int. Cl.[2] .......................... A23K 1/18; A23K 1/16
[52] U.S. Cl. ....................................... 426/92; 426/116; 426/129; 426/294; 426/646; 426/657; 426/805
[58] Field of Search ................. 426/92, 116, 129, 294, 426/589, 646, 652, 437, 656, 657

[56] References Cited

U.S. PATENT DOCUMENTS

| | | | |
|---|---|---|---|
| 1,165,924 | 12/1915 | Pitchford | 426/650 |
| 2,953,456 | 9/1960 | Mohler et al. | 426/589 |
| 3,266,908 | 8/1966 | Allen | 426/589 |
| 3,348,954 | 10/1967 | Green | 426/613 |
| 3,694,234 | 9/1972 | Jones et al. | 426/652 |
| 3,846,568 | 11/1974 | Liepa et al. | 426/646 |
| 3,901,978 | 8/1975 | Nelson et al. | 426/656 |

*Primary Examiner*—Jeanette M. Hunter

[57] ABSTRACT

A substantially homogeneous aqueous aerosol suspension of cooked, solid, finely divided proteinaceous particles which are produced by comminuting a proteinaceous material, preferably animal kidney; mixing such comminuted material with water and cooking such under non-liquifying and non-hydrolyzing conditions to produce an aqueous mass containing solid particles of cooked proteinaceous material at least part of which is not suspended; homogenizing such aqueous mass into said substantially homogenous aqueous suspension of said finely divided particles, and admixing the colloidal suspension with an aerosal propellant in a container suitable for spraying.

11 Claims, No Drawings

PET FOOD PRODUCT AND PROCESS OF PRODUCING SUCH

This invention relates to pet food. It more particularly refers to eating adjuvants for pet foods.

There are a wide variety of commercially available pet foods of the canned, or cooked variety, which is moist and contains about 70% water, the hamburger variety which is semi-moist, and the dry or so-called kibble variety, which contains about 10% water. These foods range in price generally depending upon their content of meat or other slaughter-house products. The dry variety of pet food is about half the cost of the canned variety on a full weight basis and is about one seventh the cost on a water free basis. Thus, the typical canned foods containing high proportions of meat, fish, poultry and eggs are generally more expensive than either canned foods or kibble of the type which are principally derived from cereal grains. Typically, the foods which do not contain a high proportion of meat or meat by-products are the least palatable to pet animals, and may be ignored or only nibbled by the pet in contrast to the eagerness with which they eat the more expensive foods.

Animals often respond to gustatory stimuli independent of their need for food. Most dogs don't know when to stop eating if the food is attractive to them. Certain breeds, however are particularly difficult to feed especially certain high strung show dogs. Sometimes these pets present such feeding problems that they are force fed. Domesticated cats are usually demand eaters; that is they will eat their fill and no more. However, as any cat owner knows, if the food is not to their liking, they will not eat, sometimes to an extent sufficient to starve.

Self-evidently the primary gustatory stimulus is smell, but the senses of taste and smell are intimately interrelated; both are neuro-physiologic responses to the contact between the respective receptor structures in the tongue and the nose, and the molecular species responsible for the excitation of the physiologic process. In this respect these two senses differ from the others, which are responses to specific forms of energy, namely light, sound and mechanical.

Prior to this invention, there have been attempts to increase the palatability of pet foods generally along the lines of making them appear more palatable when judged by human (as opposed to animal) standards. One such attempt to make pet foods more palatable is that disclosed in U.S. Pat. No. 3,119,691 which discloses a method for preparing foods of the kibble type that will produce a gravy upon the addition of water. While this method may have some effect in making the food more palatable, nevertheless the food is still characteristically lacking in flavor, and may be passed up by the pet.

Additional references which may pertain to the subject matter of this application are U.S. Pat. No. 2,849,323 Young, No. 3,139,342 Linskey, No. 3,348,954 Green, No. 3,366,494 Bower et al. No. 3,369,912 Livengood et al, No. 3,373,126 Lehrman et al, No. 3,622,354 Diamond, No. 3,697,434 Shefler, No. 3,770,463 McSweeney et al, and No. 3,830,798 Herndon et al. This list is not alledged to be complete or exhaustive but does represent Applicant's present knowledge.

Of these references, the Green patent bears special consideration as it is believed to represent the closest prior art presently known. This patent describes a process of producing a roast meat flavoring product by cooking meat under conditions of temperature and pressure sufficiently high to at least subsantially hydrolyze proteinaceous components thereof and to form liquified "meat particles." The process calls for comminuting the feed meat by grinding, chopping or mincing, to a size of up to about 0.5 to 1 inch, to give a soft, pliable, formless mass. This mass is mixed with water and then the aqueous mixture is cooked at temperatures above about 330° F at super atmospheric pressure above about 115 p.s.i.g. with agitation. The product resulting from the severe cooking treatment is water containing liquified meat and visible discrete meat fibers up to about 1 inch in length. This aqueous product is a liquid which is stated to be directly employable as a roast meat flavor enhancer in soups, gravies, etc. or added to dog food. It is also stated that this substantially liquid product can furthermore be homogenized and then dried to give a free flowing powder containing short meat fibers of a length less than 0.025 inch. This powder can be dispersed in water or otherwise used.

It is an object of this invention to provide a novel adjuvant for pet food.

It is another object of this invention to provide a novel means of preparing said eating adjuvant.

It is a further object to provide a novel product which will tend to increase the acceptability of food to pet animals.

Other and additional objects of this invention will become apparent from a consideration of this entire specification including the claims hereof.

In accord with and fulfilling these objects, one aspect of this invention resides in a novel process of producing a product having the ability to increase the palatability of rations to animals. This process comprises comminuting a proteinaceous material in a conventional manner to an extent sufficient to give a soft, pliable, formless mass; admixing this mass with water (these steps may be reversed if desired with the proteinaceous material being mixed with water and the mixture comminuted as aforesaid): cooking the solid proteinaceous meat particles, under relatively mild conditions insufficient to cause substantial hydrolysis and/or liquification of the particles but sufficient to cook them, to produce an intermediate product comprising water and cooked solid meat particles, which particles will settle in the water to a substantial extent if the aqueous intermediate product mixture is allowed to stand; and subjecting the aqueous intermediate product mixture to homogenization by conventional techniques whereby the aforesaid solid cooked meat particles are further comminuted to colloid size, e.g., up to about 25 microns, to form a substantially homogeneous suspension of solid, fine particles of cooked meat in water. Although the particle size of the cooked meat particles has been set forth to be up to about 25 microns, this specific dimension should not be considered as limiting. The limiting factor insofar as this product is concerned is that the solid particles of cooked meat are sufficiently small that they form a colloidal suspension in their aqueou medium.

The product produced by the aforedescribed process is to be distinguished from the product of the above referred to Green patent in that in this product the cooked meat is small, solid particles whereas in Green the meat has been substantially liquified. It is not known exactly why, but the product of this invention seems to have a more beneficial effect upon the palatability of animal rations than that of Green, when the same proteinaceous feed material is employed. While not wishing to be bound by any particular theory, it may be that those components of proteinaceous materials which are responsible for the gustatory response of animals are retained in the instant colloidal solid but are lost or diminished by further degradation of the proteinaceous material to liquid hydrolysis products thereof.

The above described product of this invention, that is the substantially homogeneous colloidal suspension of cooked solid particles, may be used as such by application directly to animal rations. It has been found however that the effectiveness of this product as a gustatory stimulant is substantially enhanced by applying the product to the animal ration in a particular manner. The colloidal suspension is brought to a solids concentration of about 1 to 20 weight percent, and is then sprayed onto the surface of animal ration which has previously been placed in a feeding dish or the like. In this regard it is preferred to spray the suspension as an aerosol with a conventional propellant.

Again, while not wishing to be bound by any particular theory of operation, it is now believed that the propellant violently evaporates either during delivery or substantially immediately after deposition onto the animal food. This may cause a disruption, perhaps violent but on a micro scale, in the individual aqueous droplets which have been delivered thereby increasing the effective presence of the colloidal particles and their olfactory message. One particulary effective propellant is a mixture of carbon dioxide and nitrous oxide. This has worked well and has the ecological advantage of not being a fluorocarbon. Liquified propellants, such as the Freons seem to be less advantageous because upon spraying they create a sound which is too high pitched for humans to hear but which may be audible to animals and as such may be frightening. Means to alleviate this problem may be available thereby permitting the use of fluorocarbon propellants.

It has been found that a rather small application of the instant product is effective in promoting gustatory response in animals. This is probably a threshold of effectiveness, although this is probably quite small, e.g. at least about 0.01 gram of product, on a water free basis, per pound of pet food. Delivered as a suspension, the solid flavor enhancer may be present in a concentration of about 4 to 16 weight per cent, never more. Although such concentrations seem to be substantially inodorous to humans, they are apparently quite effective with animals. This seems to be a particular advantage to using the compositions of this invention which are natural in origin because synthetic, overly concentrated flavors seem to have an overpowering, and therefor repelling effect when used in proportions even as low as a few parts per million.

This product is suitably applied to animal, particularly pet food in a proportion of about 0.5 to 20 grams per pound of food. It has been found that in conventional aerosol propellant formulation delivery systems with colloidal dispersions of the above recited dilutions, an application rate of about 0.6 to 1.5 grams of suspension per second is adequate. Since aerosol delivery systems are conventionally designed, taking into account internal pressure and nozzle orifice size, for a particular delivery rate, the above recited values should serve as suitable guides to the effective practice of this invention.

It is important to note that each of the individual processing steps which have been described herein is per se known in this or closely related arts and that the individual procedures and equipment used to accomplish each step are, or can be, quite conventional. No invention is here claimed in any individual processing step. Rather, the combination of these steps in the manner described to produce the product described is believed to be novel, as is the product so produced and the particularly preferred means of application. There seems to be a synergistic relationship in the entirety of the instant process, product and application thereof which produces results, in terms of animal gustatory response, which is substantially superior to that which has been achieved in the past by other products produced by other processes.

It is considered to be within the scope of this invention to carry out this process with substantially any proteinaceous feed material. The particular choice of feed material should be keyed to the particular animal whose gustatory responses are to be effected. Thus in some cases fish, poultry, beef, pork, or vegetable feed substrates may be employed. For some unknown reason, particularly good results have been achieved with the use of kidney as the feed substrate, and this is the preferred proteinaceous material of this invention.

It is also considered to be within the scope of this invention to include additional ingredients into the process to accomplish their intended functions. Thus food grade preservatives can be added at almost any point in the process, preferably early in the process. Vitamins, minerals and/or other food supplements can be added if desired as can food grade colorants or the like. Milk solids is exemplary of such materials and may be additionally included if desired. One particular additive which has been found to be useful in this product is an odorant which has a human rather than animal response; that is a material which will cause the pet food to smell appropriately to the pet's master. This latter additive is of course wholly optional and has no real relationship to the instant invention. Other relatively conventional additives which may be used in conventional amounts for conventional purposes are food grade suspending agents, emulsifiers and protective colloids. These type materials retard agglomeration, inhibit compaction and tend to prevent clogging and malfunction of nozzles and other equipment.

There are several critical features of this invention which bear emphasis. The product as delivered to the petfood ration is not a foam. Foam form materials tend to stay on the surface to which they are applied and tend not to penetrate into the interior interstices and surfaces of the pet food ration. Since it is desired that all or at least most of the food ration be consumed, it is similarly desired that the instant product be thoroughly distributed throughout the food ration. This is not to say that any degree of foaming is intolerable. It is to say that the instant product is not applied primarily as a foam.

Insofar as the cooking and homogenizing steps described above are concerned, while it is preferred to practice the sequence of comminuting-cooking-homogenizing, it is to be considered to be within the scope of this invention to reverse the cooking and homogenizing steps. The cooking step itself has been stated above to be critically different from that described in the prior art Green patent in that it is milder and does not result in substantial hydrolysis or liquification of the solid feed material. Suitable cooking temperatures are less than about 300° F, preferably less than about 260° F, at pressures up to about 2 or 3 atmospheres, preferably as close to atmospheric as possible consistent with maintaining the appropriate low cooking temperature and a reasonable cooking time. Cooking time is not itself a technologically limiting or critical value but as a practical matter should be kept to between about 15 to 60 minutes. It is most preferred to cook at about 15 p.s.i.g. autogenous pressure and about 250° F for about 20 minutes. Homogenization may be carried out in one or multiple, preferably two, stages. The proportion of water used in processing is not critical and may amount to about 1 to 30 pounds per pound of feed material. This water may be added all at once at the beginning of the process or at staged intervals.

The following Examples are illustrative of the practice of this invention without being limiting thereon. Parts and percentages are by weight unless expressly stated to be on some other basis.

| Examples | | % w/w |
|---|---|---|
| a) | Beef Kidney | 7.50 |
| | Benzoic Acid | 0.10 |
| | Water | 92.40 |

Procedure: Grind the kidney through a meat grinder. Add the water in which the preservative has been dissolved. Cook for one hour at 5psig and 220° F. Homogenize through a single stage homogenizer at 4,000psig. Pressurize using carbon dioxide to 60psig. A valve with a 0.016 stem orifice and 0.035 non mechanical break-up actuator produces a satisfactory spray.

| | | % w/w |
|---|---|---|
| b) | Beef Kidney | 16.000 |
| | Sodium Chloride | 0.750 |
| | Imitation Meat Flavor* | 0.400 |
| | Benzoic Acid | 0.100 |
| | Butylated Hydroxy Toluene | 0.003 |
| | Water | 82.747 |

*Polak's Frutal Works Meat Flavor Cw 56-44

Procedure: Reduce the kidney to small particles by passing it through a Dispersator with ½ the water, the preservative and the antioxidant. Pressure cook at 12psig and 240° F for thirty-five minutes. Add the flavor and homogenize through a two stage homogenizer, at a pressure of 3,500 psig through stage (1) and 500 psig through stage (2). Add the remaining water. Package in a pressure container using nitrous oxide to 72psig. Pasteurize for five minutes at 175° F. A 0.018 stem valve and a 0.016 actuator delivers a satisfactory spray.

| | | % w/w |
|---|---|---|
| c) | Beef Kidney | 6.000 |
| | Powdered Nonfat Milk | 3.000 |
| | Sodium Chloride | 0.500 |
| | Hydroxy Lecithin | 0.500 |
| | Sodium Carboxymethy Cellulose | |
| | Methylparahydroxy Benzoate | 0.070 |
| | Propylparahydroxy Benzoate | 0.030 |
| | Butylatedhydroxy Toluene | 0.003 |
| | Water | 89.697 |

Procedure: Grind the kidney through a meat grinder and disperse in ½ the water using an Epenbach Homomixer. Dissolve or disperse the remaining components in the residual water and add to the kidney dispersion. Pressure cook at 15psig and 250° F for fifteen minutes. Homogenize at 4,000psig stage (1) and 750psig stage (2). Package in a pressure container using nitrous oxide to 80psig. An 0.0135 stem valve and a 0.016 mechanical break-up actuator results in a satisfactory spray.

What is claimed is:

1. A process of producing a gustatory response inducing product which comprises comminuting an effective proportion of a proteinaceous substrate; forming an aqueous mass containing said comminuted substrate; cooking said aqueous mass under mild cooking conditions of about 220° F to 300° F, but insufficient to substantially liquify and substantially hydrolyze said proteinaceous substrate, thereby resulting in an aqueous mass having cooked, solid proteinaceous particles of a size sufficient to enable settling thereof; homogenizing said cooked aqueous mass to further comminute said protein particles and to form a substantially colloidal suspension of said cooked, solid proteinaceous material; adjusting the solids content thereon to about 1 to 20 weight percent; and admixing said colloidal suspension with an aerosol propellant in a container suitable for spraying.

2. The process claimed in claim 1 wherein said proteinaceous substrate is at least one member selected from the group consisting of beef, pork, poultry, fish and vegetable.

3. The process claimed in claim 1 wherein said proteinaceous substrate is kidney.

4. The process claimed in claim 1 including cooking at an autogenous pressure.

5. The process claimed in claim 4 wherein said temperature is below about 280° F.

6. The process claimed in claim 3 including homogenizing said cooked proteinaceous to an average colloidal particle size up to about 25 microns.

7. An aqueous colloidal suspension having a colloidal solids content of about 1 to 20 weight percent of a proteinaceous substrate, which has been mildly cooked at about 220 to 300° F and then homogenized to said colloidal state, admixed with an aerosol propellant in a container suitable for spraying.

8. The product of claim 7 wherein said cooked proteinaceous substrate solid is kidney in an average particle size of up to about 25 microns.

9. A method of influencing the gustatory response of animals which comprises spraying the composition of claim 7 onto the surface of a previously disposed animal food ration at a rate of about 0.6 to 1.5 grams per second whereby to apply about 0.5 to 20 grams of solid proteinaceous material per pound of said animal food.

10. The method claimed in claim 9 wherein said aerosol propellant is a mixture of carbon dioxide and nitrous oxide; and wherein said proteinaceous substrate is kidney.

11. An aqueous colloidal suspension of cooked kidney solids having an average particle size of up to about 25 microns having a solids content of about 1 to 20 weight percent.

* * * * *